May 7, 1963 R. P. CHAMPNEY 3,088,430
TILTING TRANSOM DRIVE MECHANISM
Filed March 23, 1959 4 Sheets-Sheet 1
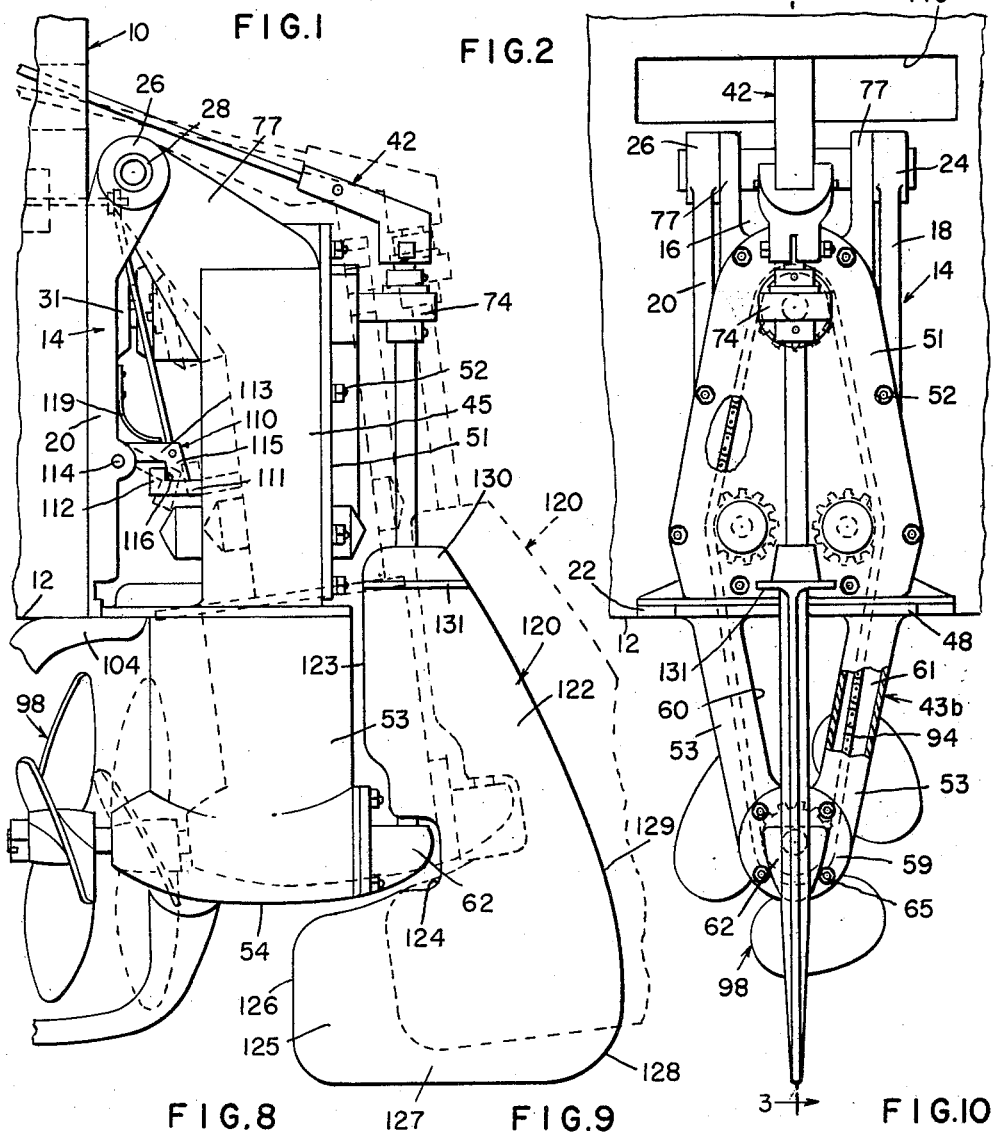
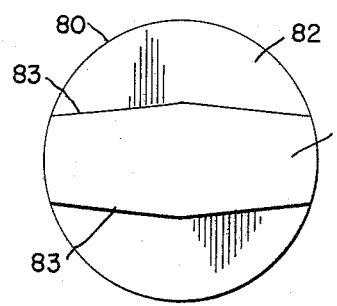
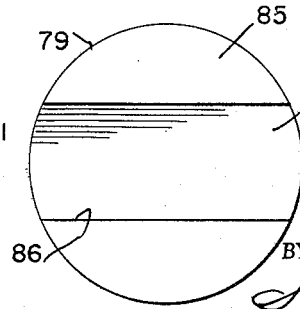
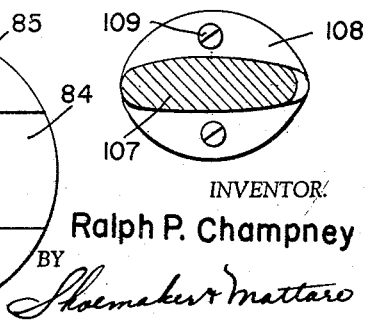
INVENTOR.
Ralph P. Champney
BY Shoemaker & Mattare
ATTYS.

May 7, 1963   R. P. CHAMPNEY   3,088,430
TILTING TRANSOM DRIVE MECHANISM
Filed March 23, 1959   4 Sheets-Sheet 2

INVENTOR.
Ralph P. Champney
BY
Shoemaker & Mattare
Attys.

May 7, 1963  R. P. CHAMPNEY  3,088,430
TILTING TRANSOM DRIVE MECHANISM
Filed March 23, 1959  4 Sheets-Sheet 3
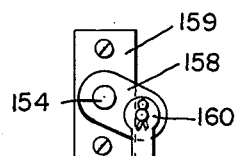
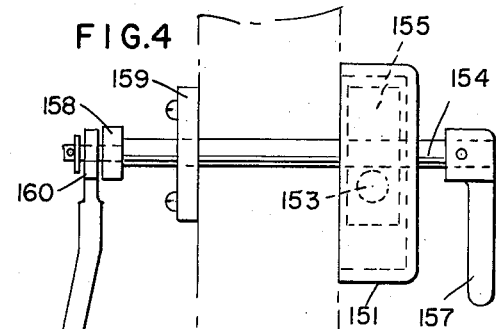
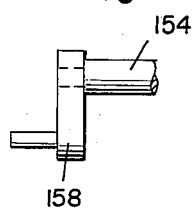
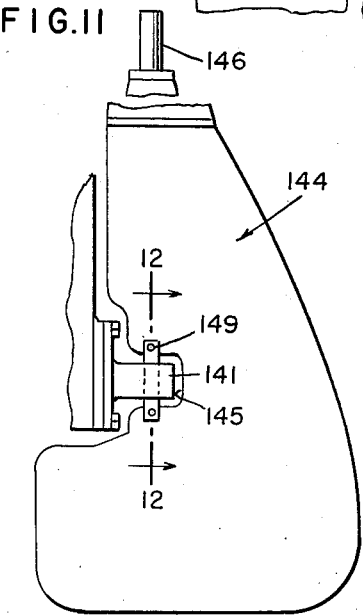
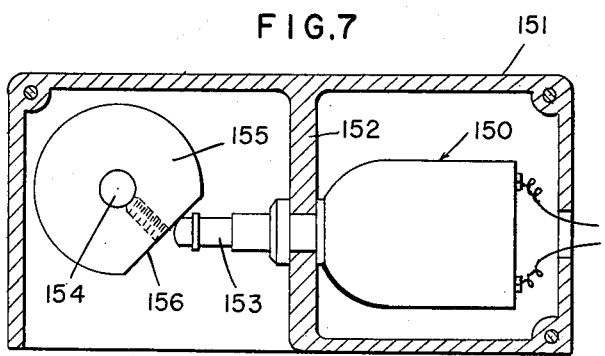
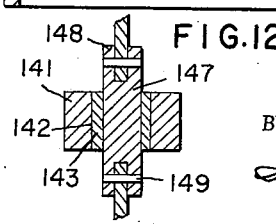
INVENTOR.
Ralph P. Champney
BY Shoemaker & Mattare
ATTYS

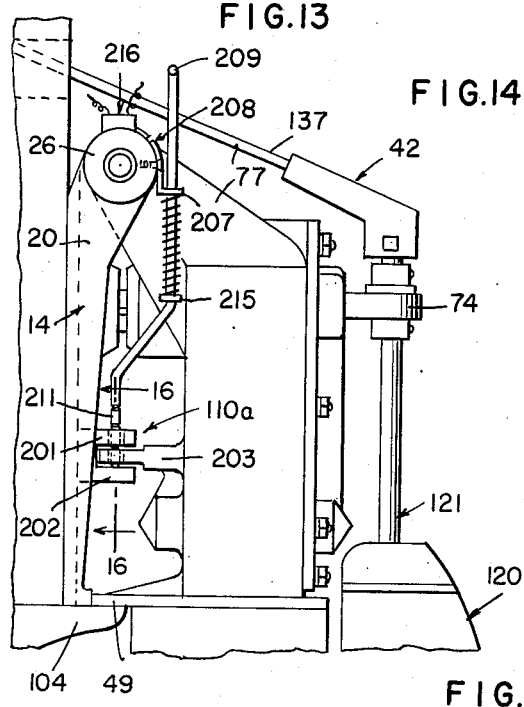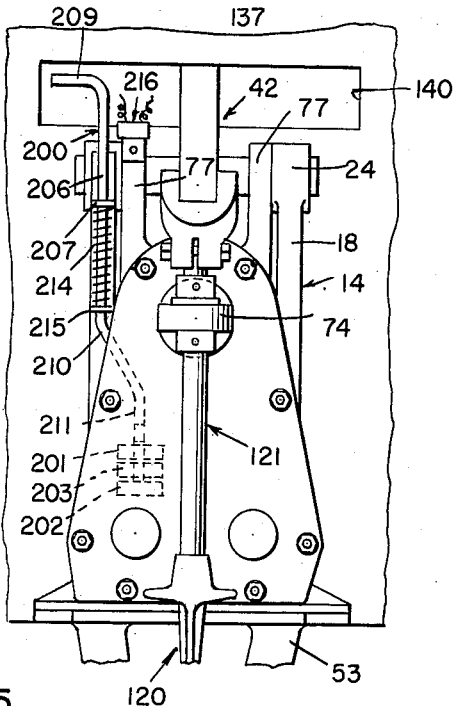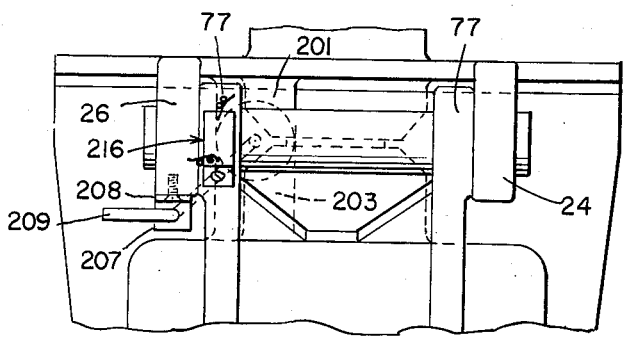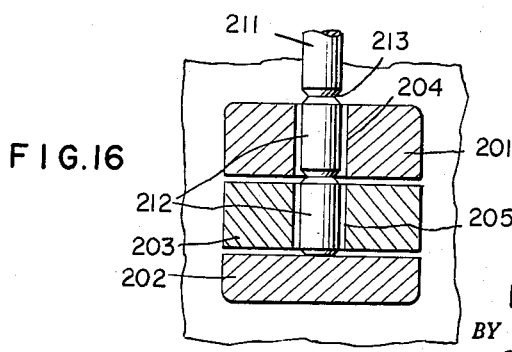

United States Patent Office 3,088,430
Patented May 7, 1963

3,088,430
TILTING TRANSOM DRIVE MECHANISM
Ralph P. Champney, Roscommon, Mich.; Carl C. Matheny, executor of said Ralph P. Champney, deceased
Filed Mar. 23, 1959, Ser. No. 801,043
12 Claims. (Cl. 115—41)

This invention relates generally to inboard-outboard drives for motorboats and is directed particularly to improvements in tilting transom driven mechanism.

The use of outboard motors on boats is becoming increasingly more popular and with the current desire for more speed outboard motors are being increasingly produced in greater size and weight for the development of greater horsepower whereby the desired increased speed can be attained. Increasing the size and horsepower of such outboard motors necessarily increases the expense of production and the cost of purchase.

In order to obtain the desired additional speed, use is frequently made of two or more such outboard motors mounted by clamps or other securing means on the boat transom. This arrangement, of course, involves the expenditure of time and considerable effort in the placing of the outboard motors in position for use and their removal from the boat.

A particular object of the present invention is to provide a new and novel tilting drive mechanism adapted to be permanently mounted upon the boat transom for connection with an inboard motor and by means of which the various disadvantages associated with the use of outboard motors are met and overcome particularly in the matter of economy of production and sale.

Another object of the invention is to provide a new and novel tilting transom drive for motorboats using inboard motors of any size and horsepower ratings and wherein such transom drive is designed so that the inboard motor may be mounted in the extreme rear of and low down in the boat, even upon the bottom thereof, thereby giving more usable room in the boat and lowering the center of gravity of the same.

Still another object of the invention is to provide a new and novel tilting transom driven mechanism wherein the same is constructed in a complete unit including a mounting transom plate for attachment directly to the rear face of the boat transom thus eliminating the necessity for securing or mounting several different parts on the transom for the support of the drive mechanism.

The present invention contemplates the use of a chain drive connection, preferably a silent chain, between the drive shaft and propeller shaft and it is another object to eliminate the use of adjustable or balancing idler sprockets and substitute fixed sprockets therefor, and effect the proper seating of the chain on its sprockets and eliminate the possibility of the chain bowing out and being throw from the idlers by installing the chain in a novel manner after subjecting it to a novel pre-installation treatment.

Another object is to eliminate the employment of adjusting or balancing idlers by calibrating the chain to a fixed length, by stressing or running the chain after it has been prestressed to approximately 50% of its ultimate strength, and then installing the chain in the drive mechanism at approximately 50% of its maximum operating load.

Still another object of the invention is to provide in a tilting transom drive mechanism for motorboats of the character referred to, a new and novel construction whereby a completely unobstructed space for the more efficient streaming of the water from the propeller through the V-strut across the rudder.

Still another object of the invention is to provide a tilting drive mechanism for motorboats which is constructed in a novel manner whereby it may be mounted easily as a complete unit as hereinafter stated, low down on the transom and which is of small transverse dimensions whereby a direct rearward exhaust for the motor may be extended through the transom in the conventional manner.

Another object of the invention is to provide in a mechanism of the character stated a new and novel rudder design and mounting therefor, whereby a substantial area of the rudder is disposed below the mechanism and below the slip stream of the propeller and the rudder is counterbalanced and torque roll is eliminated.

Still another object of the invention is to provide in a mechanism of the character stated a novel arrangement whereby free passage of sufficient water directly from the propeller rearwardly to the rudder is effected to materially stabilize the boat and practically eliminate torque roll.

Still another object of the invention is to provide in a tilting drive mechanism adapted for mounting upon the transom of a motorboat a novel automatic release means whereby the mechanism which is normally held against reverse swinging during the conventional operation of the boat propeller, is released and permitted to swing rearwardly in the event of the propeller, or a guard therearound, striking an under-water obstruction and wherein such release means is so designed that after the obstruction is passed, the mechanism may be readily brought back and secured in its former operative position easily and quickly without the necessity of using such coupling elements as bolts, pins or the like which would have to be manually installed.

A still further object of the invention is to provide a release means according to the preceding description embodying readily releasable and re-engageable elements in the form of a keeper and hook-like element one of which elements is fixed to the part of the mechanism directly attached to the boat transom while the other one of the elements is carried upon the swingable portion of the mechanism.

A still further object of the invention is to provide a novel release means according to the preceding description which embodies a novel shear pin assembly so mounted and associated with stationary and swingable parts of the mechanism that one of the pins occupying a securing position will be broken or sheared off when an underwater obstruction is encountered and another pin of the assembly will be shifted into a position which will prevent re-engagement of clutch driving means forming a part of the mechanism when the rearwardly swung part of the mechanism returns toward its normal position, means being provided in the shear pin assembly whereby the entire assembly can be manually actuated for the placement of a new shear pin in coupling position between parts of the mechanism.

Still another object of the invention is to provide in a tilting drive mechanism for mounting upon the transom of a motorboat, a novel readily disengageable and re-engageable clutch drive between a fixed primary drive shaft and a secondary shaft carried by the tilting portion of the mechanism whereby delivery of power to the propeller is immediately stopped upon the backing, swinging or tilting of the mechanism and also, whereby as a result of such tilting or back swinging of the mechanism, a positive cut off and stopping of the motor is brought about to prevent the motor racing as would otherwise occur.

The invention also has for an important object a rudder construction of new and novel form having lateral fins located above the V-strut opening in a position to be engaged upon the undersides by and for suppressing the "rooster tail" produced by the propeller.

Yet another object of the invention is to provide a novel manner of mounting a molded metal rudder, such as a rudder formed of aluminum, for example, by means of which the rudder can be easily and quickly set up for operation upon the rear of the drive chain housing.

The invention also has for an object to provide a new and novel rudder construction of fiber glass having the tiller shaft molded therein.

Other objects and advantages of the invention will become apparent as the description of the same proceeds and the invention will be best understood from a consideration of the following detailed description taken in connection with the accompanying drawings with the understanding that the invention is not confined to a strict conformity with the showing of the drawings but may be changed or modified so long as such changes or modifications mark no material departure from the salient features of the invention as expressed in the appended claims.

In the drawings:

FIG. 1 is a view in side elevation of the tilting transom drive mechanism of the present invention showing the same in full lines and operative position and mounted upon the rear face of a vertical transom and showing the mechanism in broken lines in tilted position;

FIG. 2 is a view in rear elevation of the structure shown in FIG. 1;

FIG. 4 is a view in side elevation and on an enlarged scale of the switch operating engine cut out operatively connected with the pivoted latch which functions upon the propeller guard striking an under-water obstruction which brings about the raising of the latch to permit the mechanism to move to the tilted drive disconnecting position shown in broken lines in FIG. 1;

FIG. 5 is a view in elevation of the parts shown in FIG. 4 as seen when looking toward the rear side of the transom;

FIG. 6 is a detail view in side elevation of the crank and pin connecting the switch with the pivoted latch through the connecting link;

FIG. 7 is a detail view illustrating the cut out switch and operating cam, the same being shown in a sectioned housing;

FIG. 8 is a view in elevation and on an enlarged scale of the toothed head of the disconnecting clutch, which head is shown in FIG. 3 as carried on the secondary drive shaft;

FIG. 9 is a view in elevation of the toothed receiving jaw face of the head portion of the disconnecting clutch forming the head of the primary drive shaft;

FIG. 10 is a sectional detail taken on the line 10—10 of FIG. 3;

FIG. 11 is a view in side elevation of a molded metal rudder and showing the means by which the same is coupled with the supporting lug carried on the rear of the mechanism housing;

FIG. 12 is a sectional view on an enlarged scale taken substantially on the line 12—12 of FIG. 11;

FIG. 13 is a view in side elevation of the upper portion of the tilting transom drive mechanism and illustrating the use of multiple shear pin unit for releasably securing together the hingedly connected parts of the mechanism;

FIG. 14 is a view in rear elevation of the upper portion of the mechanism shown in FIG. 13 and further illustrating the form of the multiple shear pin unit;

FIG. 15 is a view in top plan of the mechanism shown in FIGS. 13 and 14;

FIG. 16 is a sectional view taken substantially on the line 16—16 of FIG. 13.

Figure 3:
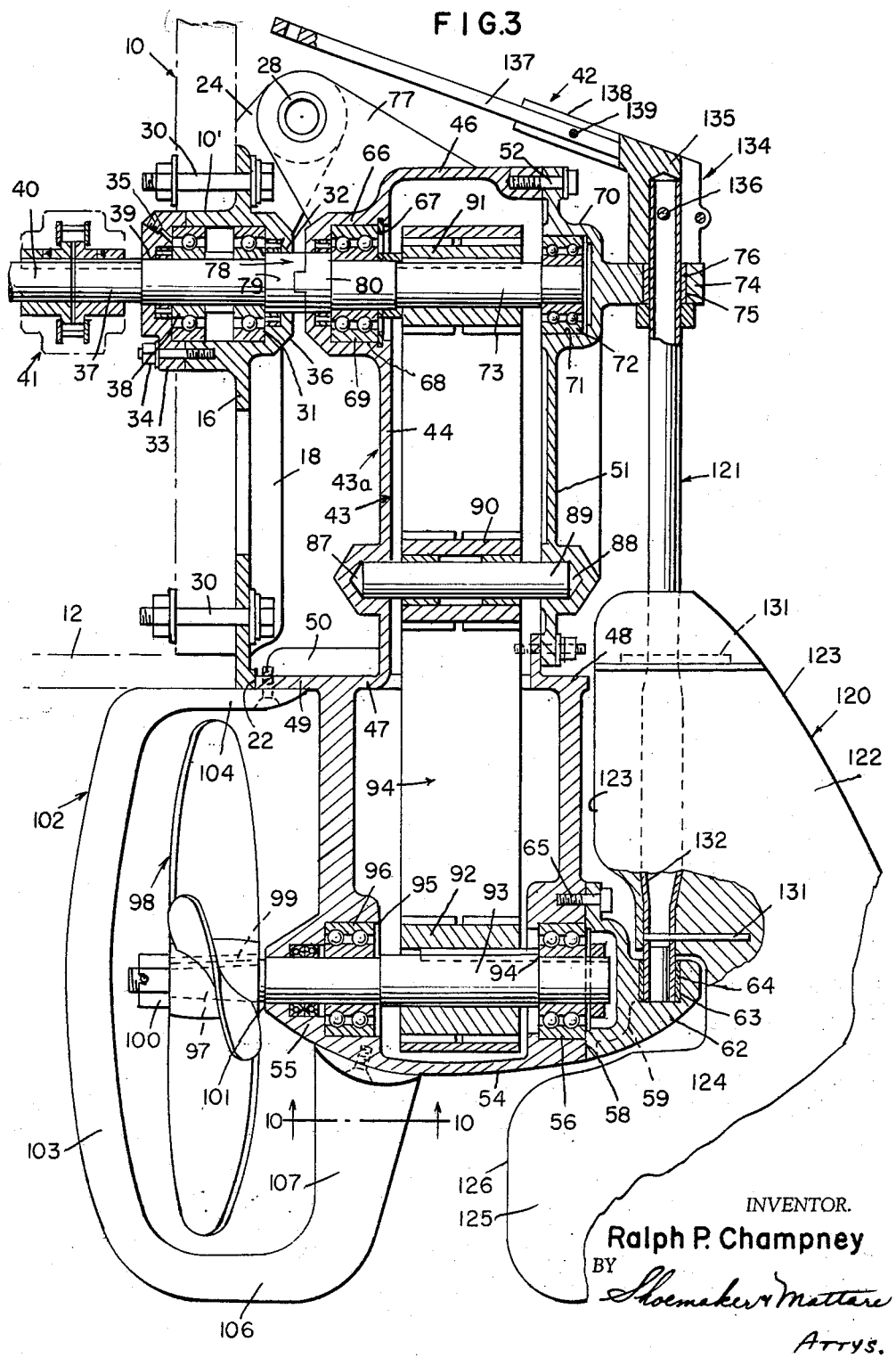
FIG. 3 is a vertical central section taken substantially on the line 3—3 of FIG. 2, with certain of the parts shown in elevation, the vertical section being on an enlarged scale.

Referring now more particularly to the drawings wherein like numerals of reference designate corresponding parts throughout the several views, the numeral 10 generally designates in FIGS. 1 and 2 the rear end or transom of a boat and in FIGS. 3 and 4 the transom is shown in broken lines. In these figures also the numeral 12 designates the bottom of the boat hull.

The transom here illustrated is of the straight up and down or vertical type but it is to be understood that the drive mechanism of the present invention is readily applicable to an inclined or sloping transom by the employment of a suitable fill out block or wedge to provide the vertical rear face to which the mounting plate of the mechanism is secured. While such block or fill out wedge is not illustrated, it will be readily apparent how such a fill out member can be employed.

The mechanism of the present invention comprises a mounting plate generally designated 14 upon which the drive mechanism is pivotally hung in the manner hereinafter set forth.

The mounting plate comprises an elongate flat body 16, see FIG. 3, having formed along its longitudinal edges the relatively heavy reinforcing ribs 18 and 20. These ribs project from the rear face of the plate body 16 and extending across the bottom and on the rear side of the plate body is a striker rib or reinforcement 22, the purpose of which will hereinafter become apparent.

The upper ends of the rearwardly projecting reinforcing ribs 18 and 20 merge into the heavy upwardly and rearwardly projecting bearing or pivot ears 24 and 26 and these bearing ears have mounted therein the ends of a cross connecting shaft 28 on which the swinging part of the mechanism is hung by the means and manner hereinafter set forth.

Near its top end the mounting plate body 16 carries a bearing box 29 which, as shown in FIG. 3, is cast integral with the plate body 16 and the major portion of this bearing box, which is of circular form, projects rearwardly from the plate body 16 and the transom 10 is provided with a suitable opening 10' through which the rear and cap closed end of the bearing box projects, when the plate body 16 is mounted in position against the rear face of the transom.

When the plate body is mounted for use, it is secured in position by suitable bolts 30 extended through openings provided in the plate body at the top and bottom and adjacent to the corners thereof. The plate body is, of course, mounted in vertical position as shown in FIGS. 1, 2 and 3 with the bottom edge of the plate flush with the bottom surface of the hull. The over-all height of the mounting plate is relatively small as compared with the height of the boat transom and accordingly it will be seen that the inboard mounted engine can be placed low down in the hull for connection with the drive shafts about to be described, thus not only giving or providing maximum space in the hull, but also lowering the center of gravity of the boat and the width of the mounting plate and the pivoted mechanism hung thereon is also small as compared with the width of the transom and accordingly will not interfere with the extension of the motor exhaust pipe rearwardly through the transom in the conventional manner.

The bearing box 29 is formed at its rear with the head 31 through which is formed the shaft opening 32 while the inner end of the box is closed by the cap 33 secured in place by bolts 34 and the cap is provided with the opening 35 in the top part thereof for a grease fitting, whereby grease can be injected into the box.

The inner face of the bearing box head 31 and the inner face of the cap 33 are suitable recessed to receive a grease or oil seal 36 which encircles the primary drive shaft 37 which extends through the bearing box and is supported by the bearing units 38 which are preferably of the ball bearing type and which are mounted in the box in the manner shown. As these bearing units or bearings are of conventional form and function in the obvious manner, no further description of the same is deemed necessary and this applies also to the oil or grease seals 36.

The primary drive shaft extends forwardly through an opening 39 in the cap 33 and through the grease seal or ring carried by the cap for connection with the rear end of the shaft 40 of the motor and this connection is effected preferably through the medium of a suitable flexible coupling unit which is generally designated 41. The coupling unit 41 is of a standard make or construction and, therefore, further description of the same is not believed to be necessary.

In some applications of the mechanism the drive shaft 37 may be eliminated, or partially so, and a connection made directly with the motor shaft with elimination of the coupling 41. In other words, the motor could be moved backward and one element of the hereinafter described clutch part directly secured to the motor shaft. Such an arrangement will permit the positioning of the inboard motor closer to the rear transom by the elimination of the coupling 41.

The tilting mechanism unit carrying the propeller and rudder and other parts is generally designated 42. This unit includes a single, one-piece housing structure for encasing sprocket and drive chain mechanism, etc., and this housing structure is generally designated 43, and, as shown in FIG. 2, is of elongated diamond shape or form and embodies an upper part or portion 43ª and a lower part or portion 43ᵇ. It is preferred that in the construction of this housing these upper and lower portions be formed or cast all on one piece as this gives a very rigid construction.

The upper portion 43ª is in the form of a case having the vertical forward wall 44, the upwardly converging side walls 45 and the rounded top wall 46 with which the side walls emerge and by which they are connected.

The lower portions of the forward wall and side walls 44 and 45 respectively are connected with a bottom plate 47 which is disposed transversely of the unit and horizontally when the unit is in vertical operating position as shown in FIGS. 1 and 2 and this bottom plate extends outwardly to form the surrounding, projecting flange 48.

At the forward side of the upper portion of the housing, this flange 47 is extended as at 49 to form a striker which engages the striker rib 42 when the mechanism is in vertical operative position as shown in FIGS. 1 and 2.

The numeral 50 designates one of a pair of reinforcement ribs which form a part of the extended striker forming portion 49 of the flange 48.

The rear side of the upper portion of the housing is closed by the removable cover plate 51 which is secured in position over the rear side of this upper portion by bolts 52. This cover plate, together with the forward wall 44, will be described in further detail hereinafter.

The lower portion 43ᵇ of the chain housing is cast integral with the bottom plate 47 and, as shown in FIG. 2, is in the form of a downwardly extending V-strut embodied in two tubular legs 53 which extend in downwardly converging relation and join and open into an elongated, streamlined shaft housing 54, the long axis of which extends horizontally fore and aft of the unit and of the boat when the unit is mounted in working position thereon.

This longitudinally streamlined shaft housing 54 terminates in the forwardly directed nose portion 55, while the rear end of the housing 54 is formed with the axial opening 56 in which is fitted a liner sleeve 57 flanged at its outer end as indicated at 58. This opening is covered or closed by the streamlined cap 59.

The tubular strut legs 53 are of elliptical streamlined form and are disposed with the long axis of the ellipse extending fore and aft so as to provide inner and outer streamlined surfaces across which the water will flow smoothly and without turbulence and as shown in FIG. 2, the V arrangement of the legs provides a water passage or space which when the unit is mounted in the manner illustrated with the bottom edge of the mounting plate 14 flush with the bottom surface of the boat hull as previously stated, lies entirely below the plane of the bottom of the hull so that, as hereinbefore stated, sufficient water will pass directly from the propeller to the rudder through and around the struts or fins to materially stabilize the boat, which will practically eliminate torque roll.

The hollow or tubular legs 53 provide passageways which open at the lower ends of the legs into the shaft housing 54 while the upper ends of the legs open at 61 through the bottom plate 47 for the passage of upwardly and downwardly moving flights of the hereinafter described driving chain which transmits power from the engine shaft to the propeller.

The cap 59 closing the opening 56 in the rear end of the shaft housing 54 carries the rounded rearwardly projecting bearing lug 62 having formed in the top side thereof the step 63 in which is a bearing 64 and in which bearing the lower end of the tiller shaft hereinafter described, is stepped or set.

As is also clearly shown in FIG. 3, the cap 59 is fixed in position to close the opening 56 by bolts 65 which pass through openings in the cap adjacent to the edge thereof and are threaded into the end of the housing 54.

The wall 44 of the upper housing portion 43ª is provided with the forwardly projecting bearing cup 66 which opens rearwardly into the housing as shown, the cup forming the receptacle 67 for the shaft bearing unit 68.

The forward end of the cup 66 has the opening 69 formed therethrough for the purpose hereinafter described.

The coverplate 51 is also formed adjacent to its top end to provide the rearward shaft bearing cup 70 which is coaxial with the cup 66 and which provides an inwardly opening receptacle 71 for the reception of a bearing unit 72 which is in alignment or coaxial with the bearing unit 68 to receive the rear end of the secondary drive shaft 73, the forward end of the shaft being mounted in the bearing unit 68 in the manner shown.

The rear side of the bearing cup 70 is formed integral and has projecting rearwardly therefrom an ear 74 through which is formed a guide opening 75 having fixed therein a bearing 76 which is axially aligned with the bearing 64 to receive the upper end of the hereinafter described vertical tiller shaft.

The upper end portions of the side walls 45 of the upper housing portion 43ª have cast integrally therewith the spaced parallel hanger arms 77 which are arranged to fit snugly between the bearing ears 24 and 26 and are suitably apertured, not shown, to have the shaft 28 pass therethrough. These hanger arms extend upwardly and obliquely across the top portion of the forward wall 44 of the chain housing and the ends of the arms are located a substantial distance above the top of the housing and since these arms extend from the shaft 28 downwardly and rearwardly to the top of the chain housing, it will be seen that the entire drive mechanism will tend to swing forwardly at its lower end and thus bring the striker portion 49 of the flange 48 against the striker rib 22 to maintain the housing vertical and in spaced relation with the mounting plate 14 as shown in FIGS. 1 and 3.

When the mechanism is disposed vertically in operative position as it is shown in FIGS. 1 to 3, the primary and secondary driving shafts 37 and 73 respectively will be in perfect alignment and their opposing ends will be operatively coupled together by the quick release and quick engaging clutch shown in side elevation in FIG. 3 and generally designated 78. This clutch embodies the two enlarged circular heads 79 and 80 formed respectively upon the shafts 37 and 73 and rotatably located or positioned in the openings 32 and 69 which are formed respectively in the adjacent walls of the bearing box 29 and the bearing cup 66.

This clutch 78 is a novelly designed single toothed clutch, which single tooth is designated 81 and as shown in FIG. 8 extends entirely across the diameter of the face 82 of head 80.

The tooth 81 has its side faces 83 tapered slightly in opposite directions from the transverse center of the tooth so that the tooth is of maximum width across its center and tapers radially outwardly to its ends and the maximum width of the tooth in the central portion thereof is approximately equal to or slightly less than the width of the tooth slot 84 which is formed in and diametrically of and across the face 85 of the head 79. This slot 84 which receives the tooth, has parallel side faces 86 and thus it will be seen that when the tooth 81 is located in the slot, in the engaged clutch, opposite faces of the tooth in opposite end portions will be in driving engagement with the wall faces 86 of the slot. This clutch construction provides for easy and quick disconnection of the shafts and reconnection of the same when the mechanism is caused to swing backwardly away from the boat transom and is then brought forwardly again into operating position.

The forward wall 44 of the chain housing upper portion and the cover plate 51 are each provided with two transversely spaced inwardly facing and aligned pin sockets, those in the wall 44 being designated 87 and those in the cover plate 51 being designated 88. These sockets receive the ends of and support idler sprocket carrying pins 89, the idler sprockets rotatably mounted thereon being designated 90. As shown in FIG. 2, these idler sprockets are equidistantly spaced from and on opposite sides of a vertical plane passing through the axial centers of the secondary drive shaft 73 and the hereinafter described propeller shaft mounted in the housing 54.

The secondary drive shaft 73 carries the sprocket 91 which is in driving connection with a corresponding sprocket 92 secured to and carried upon the propeller shaft 93 which is mounted in and extends axially through the housing 54. This connection between the sprockets 91 and 92 is by means of the chain drive belt which is generally designated 94 and which may be of any suitable design or construction, preferably of the silent chain type. The chain is trained over the drive and driven sprockets 91 and 92 respectively and passes across the outer sides of the idler sprockets 90.

As will be readily apparent, the drive mechanism of the present invention, which employs a silent chain connection or drive between the shaft 73 and the propeller shaft 93, is trained over transversely spaced idler sprockets which are mounted upon fixed carrying or supporting pins 89. The chain drive belt is so treated before its installation and also in the process of installation that there will be no subsequent elongating or stretching thereof and the chain will not be thrown or bowed out from the idler sprockets during the operation of the drive mechanism.

The treatment referred to and by means of which these desirable results are attained is as follows. First, the chain, after being manufactured, is given a pre-stressing to approximately 50% of the ultimate strength of the chain. Following such pre-stressing each chain made up for installation in the drive mechanism is calibrated by further stressing or running of the chain to a fixed length. The chain then is installed in the housing for operation and such installing is made at approximately 50% of the maximum operating load. This procedure covers the initial strain and proper seating of the chain on its sprockets and accordingly eliminates the necessity of using adjustable idlers or tensioners.

By the provision of the removable cover plate 51 and the cap 59 the sprockets 91 and 92 and chain can be readily changed to give different drive ratios as may be desired.

The propeller shaft 93 is supported at its rear end in the bearing 94 which is mounted in the sleeve 57.

At the forward end of the shaft housing 54, the housing has the inwardly opening receptacle 95 in which is mounted the forward bearing 96 for the propeller shaft 93.

The forward end of the propeller shaft 93 has the tapered portion 97 which projects beyond the nose portion 55 of the housing 54 and on this tapered portion 97 the caterpillar propeller 98 is keyed.

The taper 97 of the shaft and the bore of the propeller hub 99 are dimensioned so that when the propeller is firmly fixed on the shaft and secured in place by the nut 100, a space 101 will be formed or provided between the end of the shaft 93 where the tapered portion 97 starts and the hub of the propeller in which can be inserted a proper tool for effecting the removal of the propeller when the nut 100 is removed. Thus by the provision of this space the propeller can be forced off of the tapered end of the shaft without the necessity of using a gear or propeller puller.

The propeller is, as shown, at the forward end of the housing 54 and when the mechanism is in vertical driving position, the propeller will be located substantially directly beneath the transom of the boat.

The numeral 102 generally designates a propeller guard which may be employed in the position shown to shield the caterpillar propeller against striking any under-water obstruction. This novel guard is not absolutely essential when a caterpillar type propeller is used since, as is well known by those versed in the art, the caterpillar type propeller, in the event of its striking a submerged log or similar obstruction, will roll or turn itself off of the obstruction without suffering damage whereas this would not be true of a conventional drive means.

This guard frame is substantially in the form of the letter G, having the slightly arcuate vertically positioned body portion 103 which at its upper end joins the rearwardly directed arm 104, the upper side or surface of which is properly formed or flattened to fit adjacent to its rear end against the underside of the striker 49 to which it is secured by suitable bolts or screws 105. The arm 104 is fixed to the striker 49 to lie in the vertical plane of the axis of the propeller and the body portion extends down and then rearwardly as at 106 to join the upwardly extending post 107 which, as shown in FIG. 10, is of elliptical streamlined cross section and terminates at its top end in the attachment head plate 108 which is fitted to the underside of the housing 54 to which it is secured by screws 109 or other suitable means.

When the drive mechanism is in the suspended, vertical or operative position as it is shown in FIGS. 1, 3 and 13, it is so maintained against rearward swinging movement under normal operating or driving conditions by a releasable coupling means between the housing upper portion 43 and the adjacent mounting plate 14. The release of this coupling means is effected automatically in the event of the propeller or the propeller guard striking with some considerable force against an underwater obstruction.

There are illustrated two types of releasable coupling means which are adapted for service in connection with mechanism of this character, one such means being illustrated in FIGS. 1, 4 and 5 and generally designated 110, while the other releasable coupling means is illustrated in FIGS. 13 to 16 and is generally designated 110ª and is hereinafter described in detail.

Both of the releasable coupling means operate under the effect of a shock imposed upon the rearwardly swinging portion of the mechanism. In the form of such releasable means which is generally designated 110 there are provided a fixed rigid hook member 111 attached to the wall 44 at one side of the unit and directed forwardly and terminating in the short upward extension or bill 112 with which coacts a hook member 113 in the form of a pivoted hook latch which is attached by suitable pivot means 114 to the adjacent rib 20 of the mounting plate 14 to extend rearwardly therefrom. This hook latch is adapted to swing upwardly on its pivot and it includes a downwardly extending bill 115 which is adapted to engage behind the hook member bill 112 and which has the slightly downwardly and rearwardly inclined face or surface 116 for engagement against the hook member or bill 112. This inclined face 116 is not sufficient to effect the disconnection of the release under normal strain but will cause the latch hook to snap or fly upwardly in the event of a violent blow being applied to the forward part of the propeller guard frame 102 such as would be the case if the propeller guard should strike a fixed underwater obstruction.

As shown particularly in FIG. 5, the hook latch 113 has the end portion which is mounted on the pivot 114 positioned between a pair of spaced ears 117 and this end portion of the hook latch is formed with a flat rear end surface 118 which when the members 111 and 113 are separated, will permit the member 113 to swing downwardly slightly so as to position the portion 115 in opposed relation with the bill 112 which it will strike when the mechanism attempts to swing back to its original position as it is shown in broken lines in FIG. 1.

For obtaining additional resistance to the release of the latch hook 113, there may be provided a leaf spring 119 secured at one end as illustrated to the rib 20 and curving downwardly and rearwardly and bearing at its other end upon the top of the latch hook 113 as shown. Thus, further resistance to the upward swinging of the latch hook will be had and a positive downward movement will be given to it after release to bring it in position for engagement against the fixed hook member 111.

While the release means 110 is designed to function under shock which will merely cause the hook member 113 to snap upwardly, no part is broken to complete the separation of the housing from the plate. However, in the second release means which is generally designated 110ᵃ and shown in FIGS. 13 to 16, a novel type of shear or break pin is employed which in its make-up is not only designed so as to release the mechanism housing to swing rearwardly when the propeller or propeller guard receives a sufficiently strong blow which will cause the pin to break, but is designed so as to prevent the return movement of the suspended housing to its former operative position and consequently prevent the recoupling together of the clutch drive connection 78 between the shafts at the top of the housing.

In the second form of the release means there is provided the long shear pin rod 200 which is suspended from the bearing or pivoted ear 26 for operation in association with coacting lugs supported respectively upon the mounting plate 14 and the upper part 43ᵃ of the housing 43.

In the description of the second mentioned releasable means where parts are illustrated in FIGS. 13 to 16 which are the same as parts illustrated in the preceding figures, the same reference numerals will be used, new reference numerals being used only for those parts not illustrated in the figures preceding FIG. 13.

The lugs with which the shear pin rod cooperates are designated 201, 202 and 203. The lugs 201 and 202 are integral with the plate 14 and project rearwardly therefrom in vertically spaced parallel relation. The lug 201 has an opening 204 formed vertically therethrough while the underlying lug 202 has no such opening but is solid and functions as a stop in the manner hereinafter described.

The lug 203 is fixed to the forward side or forward wall 44 of the housing upper portion 43ᵃ and is formed for extension into the space between the lugs 201 and 202 and has a vertical shear pin opening 205 which is aligned with the opening 202 when the releasable means is functioning or, in other words, when the mechanism housing is hanging in its vertical operative position, as shown in FIG. 13.

The shear pin rod 200 has a relatively long straight upper portion 206 which extends through an opening in a rearwardly projecting ear 207 of a bracket member 208. This bracket member is fixed in a suitable manner to the stationary pivot ear 26 as illustrated.

The upper end of the portion 206 is formed to provide a handle of a suitable character as indicated at 209.

The rod 200 includes the oblique middle or intermediate section 210 which extends forwardly and inwardly or toward the central portion of the mounting plate and this oblique intermediate portion joins the straight lower terminal portion 211 which through the major portion of its length is made up of a series of end joined shear or break pins 212. The break pins or shear pins 212 can be fashioned in any desired manner or joined in any desired manner, a simple and preferred manner of providing the same being here shown as effected by circumferentially grooving the lower end portion of the shear pin rod at regularly spaced intervals forming the constrictions or circular areas of reduced diameter as indicated at 213. These pins 212 are of a length approximating the vertical thickness of the housing carried lug 203 and thus it will be seen that when the lower end portion 211 of the rod is extended through the aligned openings 204 and 205 the lowermost pin will rest upon the stop lug 202 and the upper end of the pin will terminate just below or in the plane of the bottom part of the upper lug 201. It will be obvious from this arrangement that when a sufficiently violent blow is imposed upon the propeller of the drive mechanism or upon the propeller guard, the housing will be forced to move rearwardly and the lug 203 will pull upon the lowermost shear pin and snap it off from the next pin above so that the housing can swing rearwardly and thus avoid damaging the propeller and also effect the disconnection of the clutch mechanism in the manner hereinbefore described.

When this action takes place the tendency will be for the shear pin rod 200 to move down but in order to ensure this action the rod has thereon below the bracket ear 207 the expansion coil spring 214 which bears at its upper end against the ear 207 and bears at its lower end upon the collar 215 secured around the lower part of the rod portion 206. Thus it will be seen that when the lug 203 moves out from between the lugs 201 and 202, the spring 214 which is continually under some compression, will project the rod downwardly until the lower pin hits the stop lug 202. This pin will then block the return of the lug 203 to its former position between the spaced lugs and maintain the clutch disengaged. An attendant on the boat can then effect re-engagement of the clutch by pulling up on the rod 200 to permit the lug 203 to move into position where the openings 204 and 205 are aligned, and then lower the rod so that the next shear pin will be placed in working position.

The numeral 120 generally designates the rudder of novel design which is supported upon the bearing lug 62. The rudder illustrated in these FIGS. 1, 2 and 3 is shown as having the control shaft 121 formed as a separate unit, the lower end of which shaft is embedded in the body of the rudder. The reason for this construction is that this particular rudder with the separate shaft 121 is designed to be fabricated from a synthetic material, such as fiber glass, whereas the shaft 121 may be of aluminum or any other metal or other material desired.

The rudder 120, as shown, is in the form of a long vertically disposed plate body, which body is designated 122, and it is streamlined fore and aft by having the longitudinal portion in the middle part of greater thickness than the front and rear or fore and aft edges. In other words, the body of the rudder tapers from the center toward the front or forward edge and toward the back edge.

The rudder forward edge is designated 123 and is straight throughout approximately half the length of the rudder and in its lower portion it merges into the recess 124 in which the bearing lug is located and below this recess the rudder is of materially greater width from the front to the back edge, thus providing the wider lower end portion 125.

The forward edge of this wide bottom portion of the rudder 125 is substantially vertical as indicated at 126 while the bottom edge of this wide portion is straight as indicated at 127 and merges with the rounded rear corner 128. The back edge 129 curves in a long continuous arc upwardly and forwardly, converging at its upper end with the straight upper edge portion 123 so that the top end of the rudder is relatively narrow from front to rear.

Adjacent this top end which is designated 130, the rudder body has formed transversely of the two side faces and in the same transverse plane, the laterally projecting fins 131. As is readily shown in the first three figures of the drawings, the rudder when mounted upon the bearing lug 62 has approximately half of its height above the shaft housing 54 while the lower half and the widest portion of the rudder, which is designated 125, extends below the housing 54.

The rudder when set in the straight ahead or fore and aft position lies in a plane passing midway between the struts 53 and the fins 131 lie only slightly above the plate 47 which forms the bottom part of the upper portion 43a of the chain housing. These fins 131 have the specific function of blocking or suppressing the "rooster tail" which is the plume of water which is usually thrown upwardly and rearwardly from the propeller and, in this case, would be the water thus projected upwardly and rearwardly through the space or opening 60 between the tubular legs of the V-strut.

Thus, the maximum volume of water passing between the legs of the V-strut will be caused to flow across the side faces of the rudder and this together with the wide expanse of rudder lying below the propeller shaft housing and in the slip stream of the propeller gives maximum steerability which is not obtainable with other types of rudders so mounted.

The rudder shaft 121 is here illustrated as being tubular, although it may be solid if desired, and the lower portion of the shaft is of expanded form or increased diameter as indicated at 132 and is solidly embedded in the center of the rudder body. The lower end of the shaft 121 is of the same outside diameter as the bearing 64 and it extends into the recess 124 and is stepped in the bearing 64 as illustrated.

In the fiber glass rudder construction, reinforcing pins 133 extend through the shaft 121 and are embedded in the material of the rudder as shown.

The shaft 121 extends through the bearing 76 as shown, and has secured to its top end the tiller which is generally designated 134. This tiller comprises two parts, one of which is the head 135 into which the upper end of the shaft 121 extends and is fixed by the transverse pin or bolt 136, while the other is the arm 137. The head 135 has the obliquely upwardly directed bifurcated extension 138 in which is pivotally mounted on the pin 139 one end of the arm 137. The pivoted end of the arm 137 abuts the bottom of the bifurcation so that the arm is held from swinging downwardly from the upwardly and forwardly angled position in which it is shown and in which it is parallel with the bifurcated extension of the head but the arm is permitted to be swung upwardly at its forward end if necessary.

In FIG. 1 the boat transom 10 has been illustrated as having a slot through which extends the tiller arm 137 and the same arrangement has been illustrated in FIG. 13. However, any standard steering mechanism can be used and coupled with the tiller or the arm 137 may merely extend over the top of the transom, if desired, where it can be conveniently grasped by the operator of the boat.

It is also contemplated to make the tiller of other material, such as cast aluminum or the like, and when so made, the rear streamlined portion 62 of the propeller shaft housing 54 will be modified slightly as illustrated in FIG. 11. As here shown, the lug 141 corresponding to the lug 62 of the streamlined shaft housing, will be straight top and bottom to have a pin opening 142 formed vertically therethrough to receive a bearing sleeve 143.

The rudder shown in FIG. 11 and representative of one cast of metal, is generally designated 144 and is of the same contour or form as the rudder 120 and the recess in the forward edge for the reception of the bearing lug 141 is here designated 145. In the cast model of the rudder, a stem 146 is formed at the top end to have secured to it a suitable operating shaft, not shown.

For the mounting of the cast metal rudder there is provided a pin 147 adapted to fit in the bearing 143 and having its upper and lower ends transversely slotted as indicated at 148. The top and bottom edge portions of the recess 145 are slipped into these slots 148 after the pin is fixed in position in the bearing 143 and locking or securing pins 149 are then passed transversely through the ends of the pin 147 and through the portion of the rudder therein so as to lock the whole assembly together as will be readily apparent.

It will, of course, be apparent that when the mechanism housing is swung rearwardly as hereinbefore described, resulting in the disengagement of the drive connection between the shaft 73 and the engine within the boat, the engine or motor will race unless means is provided for reducing the fuel feed or cutting the ignition to stop the engine. Two arrangements are herein disclosed whereby the ignition may be cut out to stop the engine. One means of cutting or breaking the ignition to the engine is by providing an ignition controlling switch, which is generally illustrated in FIG. 7 and designated 150 and mounted on the inner side of the transom. This switch is here shown as enclosed in a housing or box 151 which has a central partition wall 152 and the switch body is located in the box on one side of the wall as shown. This switch may be of any suitable type but is preferably of the type sold under the name of the "McGill Switch" and is operated to open the circuit in which it is placed by the inward pressing of a finger 153 which extends through the partition into the adjacent compartment of the box as shown in FIG. 7.

Rotatably mounted and extending into the chamber of the box 151 into which the switch finger 153 is extended is a rock shaft 154 which carries a cam 155 in the form of a wheel having a flattened cam face 156 which opposes or bears against the end of the switch finger 153. This shaft on its inner end has an arm 157 by which it can be manipulated and upon the outer end at the rear of the transom carries the short crank arm 158.

The numeral 159 designates a bearing and support plate on the rear of the transom through which the shaft 154 passes.

The shaft 154 is located adjacent to that rib 20 of the mounting plate 14 upon which the pivoted latch 133 is mounted and the outer end of the lever 158 has pivotally connected to it at 160, an end of an operating link 161 which extends downwardly and is pivotally connected as at 162 to an end of a short pivot pin 163. The other end of this pivot pin 163 is secured to the inner side of the pivoted latch 113 as shown in FIG. 4 so that upon upward swinging of the latch 113, the shaft 154 will be turned and the cam face 156 will press the switch finger 153 inwardly to interrupt the ignition current for the boat motor.

Another and simpler arrangement for breaking the ignition circuit when the mechanism housing swings rearwardly and thereby disconnects the engine from the mechanism, is illustrated in FIGS. 13 to 15 and consists in providing a mercury switch of conventional construction and which is generally designated 216, at a suitable location upon the swinging part of the mechanism. As an example, the mercury switch is here shown as mounted upon the top of one of the housing hanger arms 77. This arm turns or swings with the housing and it will, therefore, be readily understood that when this occurs the mercury in the switch will be shifted to a position which will open the ignition circuit in which the switch is located.

From the foregoing description it is believed that the construction and operation of the mechanism of the present invention will be entirely clear or understood.

The swinging or moving portion of the mechanism defined as the tilting mechanism unit 42 is pivotally joined to the single mounting plate 14, which plate carries as an integral part thereof the bearing box 29 and bearings for and together with the primary drive shaft 37 and the lower edge of the mounting plate is fixed flush with the bottom surface of the boat hull. Thus, one mounting operation only is necessary in putting the present mechanism into position for use; namely, the fixing or mounting of the mounting plate onto the transom. The tiltable mechanism unit rests against or is braced upon the striker rub 22 when the shock release unit 110 has the two parts thereof coupled together so that there is firm support for the tilting unit at the top and midway of its ends as will be readily apparent and the entire V-strut structure, together with substantially all of the rudder, lies below the bottom of the hull so that the rudder is effective in all of the water flowing between the struts or strut legs 53 and for a substantial extent below the propeller shaft housing where the major width of the rudder lies.

When in operation, should the propeller guard 102 or propeller, or any part of the drive unit, engage a fixed underwater obstruction, the shock of the engagement will effect the separation of the fixed and pivoted latches of the release unit 110 so that the drive mechanism unit will swing rearwardly on the shaft 28. This swinging rearwardly of the unit will disengage the clutch 78 so that the rotation of the propeller will immediately stop due to the cutting off of the driving power delivered from the engine. At the same time the engine ignition circuit will be opened by the actuation of the switch finger 153 due to the turning of the cam 155 as a result of the upward thrust applied to the connecting link by the upward swinging hook latch 113. As soon as the disengagement of the hook latch occurs so that the mechanism unit can swing rearwardly, the spring 119 will force the hook latch 113 downwardly when it clears the bill 112 of the hook member 111. Then, when the drive mechanism unit tends to swing back or swing forwardly to its vertical position, the re-engagement of the clutch will be prevented due to the hook latch 113 being down and in line with the outer end of the hook member 111 so that it will butt against the outer end of this member as shown in dotted lines in FIG. 1. The boat operator can then manually actuate the shock release to permit the hook latch to re-engage with the hook member 111 and to again bring the primary and secondary drive shafts 37 and 73 respectively into operative connection through the medium of the clutch 78.

I claim:

1. A tilting transom drive mechanism for inboard boat motors comprising a mounting plate adapted to be secured to the outer face of a boat transom, an elongate vertically disposed housing, means pivotally suspending the housing at its top end from said plate for rearward swinging, a first drive shaft extending through and rotatably mounted on said plate, a second drive shaft rotatably mounted in the top of the housing, a propeller shaft rotatably supported in the lower part of said housing in parallel relation with the second shaft, said second drive shaft and said propeller shaft having a permanently fixed spaced relationship with one another, a propeller mounted on the forward end of the propeller mounted on the forward end of the propeller shaft, a drive chain in the housing between, and operatively connecting said second shaft and the propeller shaft having an installed pre-stressed condition maintained by the fixed relationship of the second drive and propellor shafts whereby wear, stretch and outbowing of the flights of the chain are substantially eliminated, a clutch means between the first and second shafts adapted to disconnect upon the swinging of the housing away from said plate, and a rudder mounted upon the rear of the housing.

2. A tilting transom drive mechanism for inboard boat motors comprising a mounting plate adapted to be secured to the rear face of a boat transom, an elongate chain housing embodying an upper casing portion and a lower V-strut portion in which the legs of the V are tubular and in spaced apart downwardly converging relation forming a water passage therebetween, the convergent ends of said legs joining the sides of and opening into an elongate propeller shaft housing, arms between and connecting the housing and the top of said plate and pivotally coupled together to permit the housing to swing rearwardly from the transom mounted plate, a bearing box integral with the upper portion of said plate for extension through a receiving opening in the transom, a first drive shaft extending through and mounted in bearings in said box, a second drive shaft rotatably mounted in the top of the chain housing, separable clutch elements carried by adjacent ends of said shafts, a propeller shaft axially rotatably supported in said propeller shaft housing, said propeller shaft housing having a rear end closed by a removable cap, sprockets carried one on said second shaft and one on said propeller shaft, a chain belt coupling said sprockets and running in said tubular legs, a propeller on the forward end of the propeller shaft, shock releasable means for coupling together the chain housing and the mounting plate, a bearing carrying lug integral with the rear side of said removable cap, and an elongate vertically disposed rudder blade rearwardly of the chain housing, said rudder blade having a forward edge having a relatively deep recess therein in which said bearing lug is positioned, a bearing element secured to the rudder blade and lying in said recess and rotatably engaged in the lug bearing, the positioning of the lug in said recess facilitating the placement of the forward edge of the rudder in close relationship to said water passage, and a tiller operatively coupled with the rudder blade.

3. The invention according to claim 2, wherein said releasable means embodies hook members, one of said hook members being rigid with said gear housing and the other hook member being pivoted to the plate for limited vertical swinging, the pivoted hook member having a downturned bill engageable behind the upturned bill of the rigid hook member and formed to be cammed upwardly from the rigid hook member bill upon application of a rearwardly directed force to the lower end of the chain housing tending to swing the latter rearwardly.

4. The invention according to claim 3, with a motor ignition control switch, and means connected to said pivoted hook member and actuated by and upon upward swinging of the pivoted hook member for opening said switch.

5. The invention according to claim 2, wherein approximately the lower half of said rudder blade extends down from the said recess below the propeller shaft housing.

6. The invention according to claim 2, wherein approximately the lower half of said rudder blade extends down from said recess below the bottom of the propeller shaft housing and a substantial portion of said lower half extends forwardly beneath the bottom of the latter housing.

7. The invention according to claim 2, wherein said rudder blade is of gradually decreasing width between its front to rear edges from the bottom to the top thereof, and laterally projecting fins on and extending transversely of the rudder blade on both sides thereof and adjacent to said top thereof and said fins lying in a common plane above and closely adjacent to the top of the said water passage formed by and between the legs of said V-strut and functioning to suppress a "rooster tail" thrown rearwardly and upwardly by the propellor.

8. Motor boat drive mechanism for operation by an inboard motor, comprising an elongate housing, means for pivotally suspending the housing from and on the outside of a boat transom for rearward swinging, releasable means for restraining such rearward swinging of the housing, an upper drive shaft and a lower driven propeller shaft in the housing, means for coupling the drive shaft with an inboard motor, said shafts having a permanently fixed relationship with one another a sprocket secured on each shaft, pivot pins supported in fixed positions and in spaced relation one with the other and in a plane extending transversely of the housing between said shafts, an idler sprocket on each pin and having a fixed relation with one another and to the sprockets on the said shafts a chain drive connecting the shaft supported sprockets and running over and engaging the remote sides of the idler sprockets and maintained by the latter with opposite flights outwardly bowed, the shaft sprockets and idler sprockets being the sole chain supporting and holding means and said chain being under longitudinal stress from the sprocket of each shaft along both flights directly to the idler sprockets and said stress being approximately one-half of the maximum operating load of the chain whereby stretching of the chain and further out-bowing with respect to the sprockets is prevented during the operation of the mechanism and whereby tensioning and take-up means are eliminated.

9. A tilting transom drive mechanism for inboard boat motors comprising a mounting plate adapted to be secured to the outer face of a boat transom, an elongate vertically disposed housing, means pivotally suspending the housing at its top end from the said plate for rearward swinging, a first drive shaft extending through and rotatably mounted on said plate, a second drive shaft rotatably mounted in the top of the housing, a propeller shaft rotatably supported in the lower part of said housing in parallel relation with the second shaft, a propeller mounted on the forward end of the propeller shaft, a drive connection in the housing between said second shaft and the propeller shaft, a clutch means between the first and second shafts adapted to disconnect upon the swinging of the housing away from said plate, coupling means between the housing and the mounting plate which is breakable to permit rearward swinging of the housing, said coupling means embodying two overlapping lugs, one of said lugs being on the plate and the other one of said lugs being on the housing, the lugs having openings which are aligned when the housing is hanging in operating position, a first shear pin disposed in the aligned openings, means for preventing the housing from returning to the said operating position following the shearing of the pin and the said swinging of the housing away from said plate, said last means comprising a second shear pin with means supporting it for movement through the opening of the said one of the lugs into a position to be engaged by and to stop the return movement of the said other one of the lugs to its initial position, and a rudder mounted upon the rear of the housing.

10. A tilting transom drive mechanism for inboard boat motors comprising a single mounting plate adapted to be secured to the outer face of a boat transom, an elongate vertically disposed housing, means pivotally suspending the housing at its top end from the top of said plate for rearward swinging, a first drive shaft extending through and rotatably mounted on said plate, a second drive shaft rotatably mounted in the top of the housing, a propeller shaft rotatably supported in the lower part of said housing in parallel relation with the second shaft, a propeller mounted on the forward end of the propeller shaft, a drive connection in the housing between said second shaft and the propeller shaft, a clutch means between the first and second shafts adapted to disconnect upon the swinging of the housing away from said plate, coupling means between the housing and the mounting plate which is breakable to permit rearward swinging of the housing, said coupling means embodying two overlapping lugs, one of said lugs being on the plate and the other one of said lugs being on the housing, the lugs having openings which are aligned when the housing is hanging in operating position, a shear pin rod, means supporting said rod for rectilinear movement in line with the opening of the said one of the lugs whereby one end of the rod is extensible into the aligned openings of the lugs, a stop means for limiting movement of said rod end through the aligned openings, said one end of the rod through a portion of its length being characterized by a plurality of end connected shear pins adapted to be introduced in succession into the openings of the lugs following the shearing off of the terminal one of the pins, means at the other end of the rod for manually moving the rod away from said stop means, spring means for urging movement of the rod toward the stop means whereby upon the shearing off of a terminal pin resulting from the forcible swinging of the housing away from said plate and separation of the lugs, the next pin will be advanced into contact with the stop means and block the return of the said other one of the lugs to its initial position, and a rudder mounted upon the rear of the housing.

11. A tilting transom driving mechanism for inboard boat motors comprising a mounting plate adapted to be secured to the outer face of a boat transom, an elongate vertically disposed housing, means pivotally suspending the housing at its top end from the said plate for rearward swinging, a first drive shaft extending through and rotatably mounted on said plate, a second drive shaft rotatably mounted in the top of the housing, a propellor shaft rotatably supported in the lower part of said housing in parallel relation with the second shaft, a propellor mounted on the forward end of the propellor shaft, a drive connection in the housing between said second shaft and the propellor shaft, a clutch means between the first and second shafts adapted to disconnect upon the swinging of the housing away from said plate, coupling means between the housing and the mounting plate which is breakable to permit rearward swinging of the housing, said coupling means embodying two overlapping lugs, one of said lugs being on the plate and the other one of said lugs being on the housing, the lugs having openings which are aligned when the housing is hanging in operating position, a first shear pin disposed in the aligned openings, means for preventing the housing from returning to the said operating position following the shearing of the pin and the said swinging of the housing away from said plate, said last means comprising a second shear pin with means supporting it for movement through the opening of the said one of the lugs into a position to be engaged by and to stop the return movement of the said other one of the lugs to its initial position, and a rudder mounted upon the rear of the housing, said first and second shear pins being joined in end-to-end relation and the said means by which the second shear pin is supported for movement facilitates the manual shifting of the second shear pin away from the position where it is engaged by the said other one of the lugs to permit full swing return of the housing to its initial position where the openings of the lugs are aligned and where a reverse shifting of the second shear pin into the aligned openings may be effected.

12. A tilting transom drive mechanism for inboard boat motors, comprising a mounting plate adapted to be secured to the outer side of a boat transom, an elongate vertically disposed housing, means pivotally supporting the housing at its top on said plate for rearward singing, a first drive shaft, means for rotatably supporting the shaft on a boat transom and extending transversely of said plate, a second drive shaft rotatably mounted in the top of the housing, clutch means for coupling adjacent ends of the shafts, a driven propellor shaft rotatably supported in the lower part of said housing in parallel relation with said second drive shaft, said second drive shaft and said driven propellor shaft each supporting a sprocket gear and said second drive shaft and the driven propellor shaft being supported in a permanently fixed spaced relationship one with the other, a pair of idler gears supported in permanently fixed relationship one with the other and spaced apart in a plane passing between said shafts transversely of and substantially perpendicular to the length of the housing, said spaced idler gears further being in positions of fixed relationship with said second drive shaft and said driven propellor shaft, a drive chain extending over and engaging only the first mentioned gears and the said idler gears and being free of engagement throughout the flights thereof with any other mechanical part of the structure between the several gears whereby the several gears form the sole supporting and holding means for the drive chain, said chain having at the time of its installation in the housing and placement on said gears an initial pre-strained or prestressed fixed length condition and the said initial pre-strained or pre-stressed fixed length condition being maintained solely and constantly by said fixed spaced relationship of said gears with which it is engaged, the said constantly maintained pre-strained or pre-stressed fixed length condition of the chain on the gears effecting the holding of the flights of the chain against outward bowing, reducing stretch of the chain and reducing wear of the chain and gears to a minimum, a propellor mounted on the forward end of the propellor shaft, and a rudder mounted upon the rear of the housing.

References Cited in the file of this patent
UNITED STATES PATENTS

| | | |
|---|---|---|
| 1,163,085 | Hardy | Dec. 7, 1915 |
| 1,567,494 | Fahrney | Dec. 29, 1925 |
| 1,795,346 | Rebl | Mar. 10, 1931 |
| 1,890,938 | Fahrney | Dec. 13, 1932 |
| 1,990,387 | Linthwaite | Feb. 5, 1935 |
| 2,011,175 | Hiorth | Aug. 13, 1935 |
| 2,185,079 | Hall | Dec. 26, 1939 |
| 2,345,689 | Snadecki | Apr. 4, 1944 |
| 2,384,582 | Wildhaber | Sept. 11, 1945 |
| 2,809,605 | Russell | Oct. 15, 1957 |
| 2,816,186 | Rands | Dec. 10, 1957 |